United States Patent [19]

Gilbert, III et al.

[11] 4,162,777
[45] Jul. 31, 1979

[54] CANTED SPAR WITH INTERMEDIATE INTERCOSTAL STIFFENERS

[75] Inventors: William W. Gilbert, III; Eduardo W. Gomez, both of Fort Worth, Tex.

[73] Assignee: The United States of America as represented by the Secretary of the Air Force, Washington, D.C.

[21] Appl. No.: 902,131

[22] Filed: May 2, 1978

[51] Int. Cl.² .............................................. B64C 3/22
[52] U.S. Cl. ........................................ 244/123; 52/84; 416/226
[58] Field of Search ................... 244/123, 124; 52/84; 428/119, 120; 416/226, 229 R, 233

[56] References Cited

U.S. PATENT DOCUMENTS

| 1,751,957 | 3/1930 | Towle | 244/123 |
| 1,781,160 | 11/1930 | Carns | 244/123 |
| 1,790,144 | 1/1931 | Haller | 244/123 |
| 2,014,801 | 9/1935 | Flader | 244/123 |
| 2,097,599 | 11/1937 | Pavlecka | 244/124 |
| 2,275,038 | 3/1942 | Whitesell et al. | 244/123 |

FOREIGN PATENT DOCUMENTS 274875  6/1930  Italy .......................................... 244/123

Primary Examiner—Barry L. Kelmachter
Attorney, Agent, or Firm—Joseph E. Rusz; Arsen Tashjian

[57] ABSTRACT

An aircraft wing box construction including canted sheet metal spar webs continuously tied to the upper and lower skins. Sheet metal intercostal stiffeners of substantially triangular configuration are spaced spanwise along the web to provide shear stiffening for the web and intermittent stabilization for the upper skin. Both the shear web and intercostal stiffeners are fastened to spanwise continuous spar caps which are attached to the upper and lower skins. These caps, supported by the intercostals and webs, provide sufficient stabilization to prevent upper skin buckling up to ultimate design stress with a minimum of shear webs thereby providing significant weight savings.

3 Claims, 5 Drawing Figures

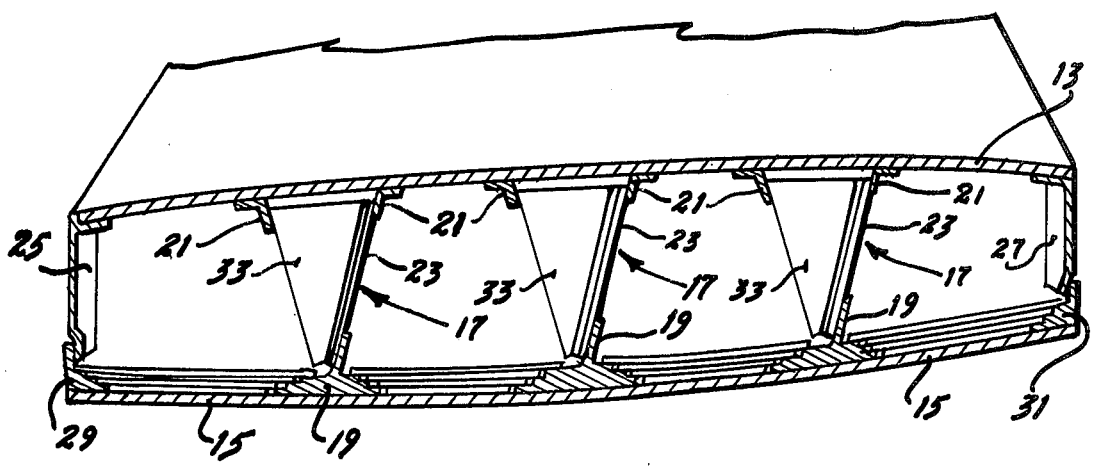
FIG. 1
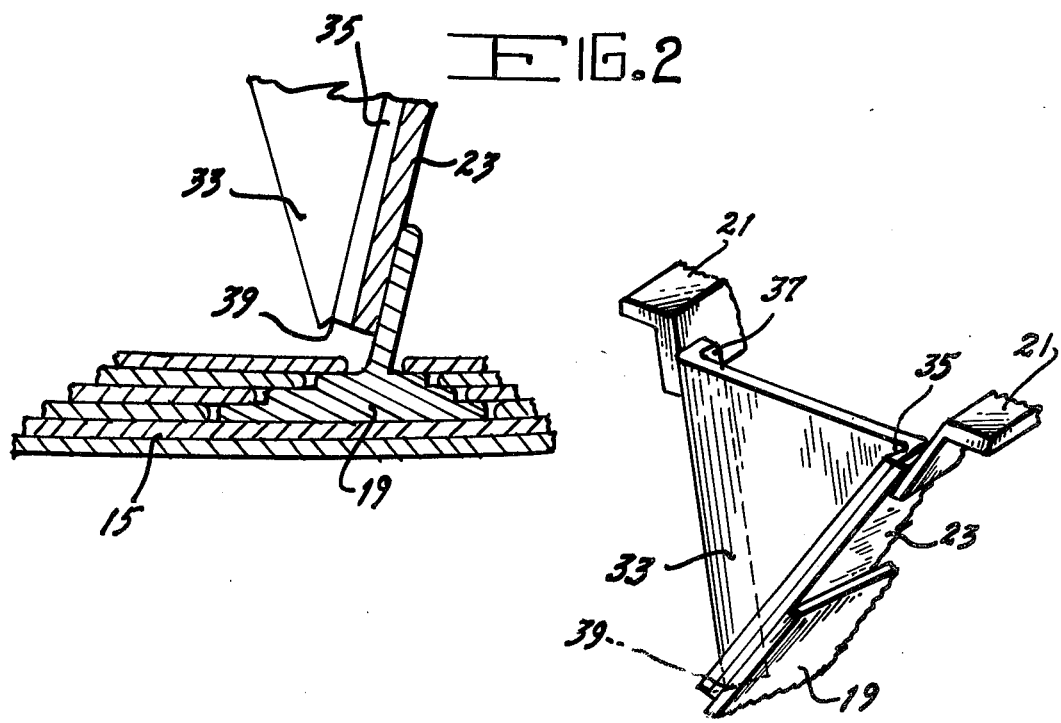
FIG. 2
FIG. 3

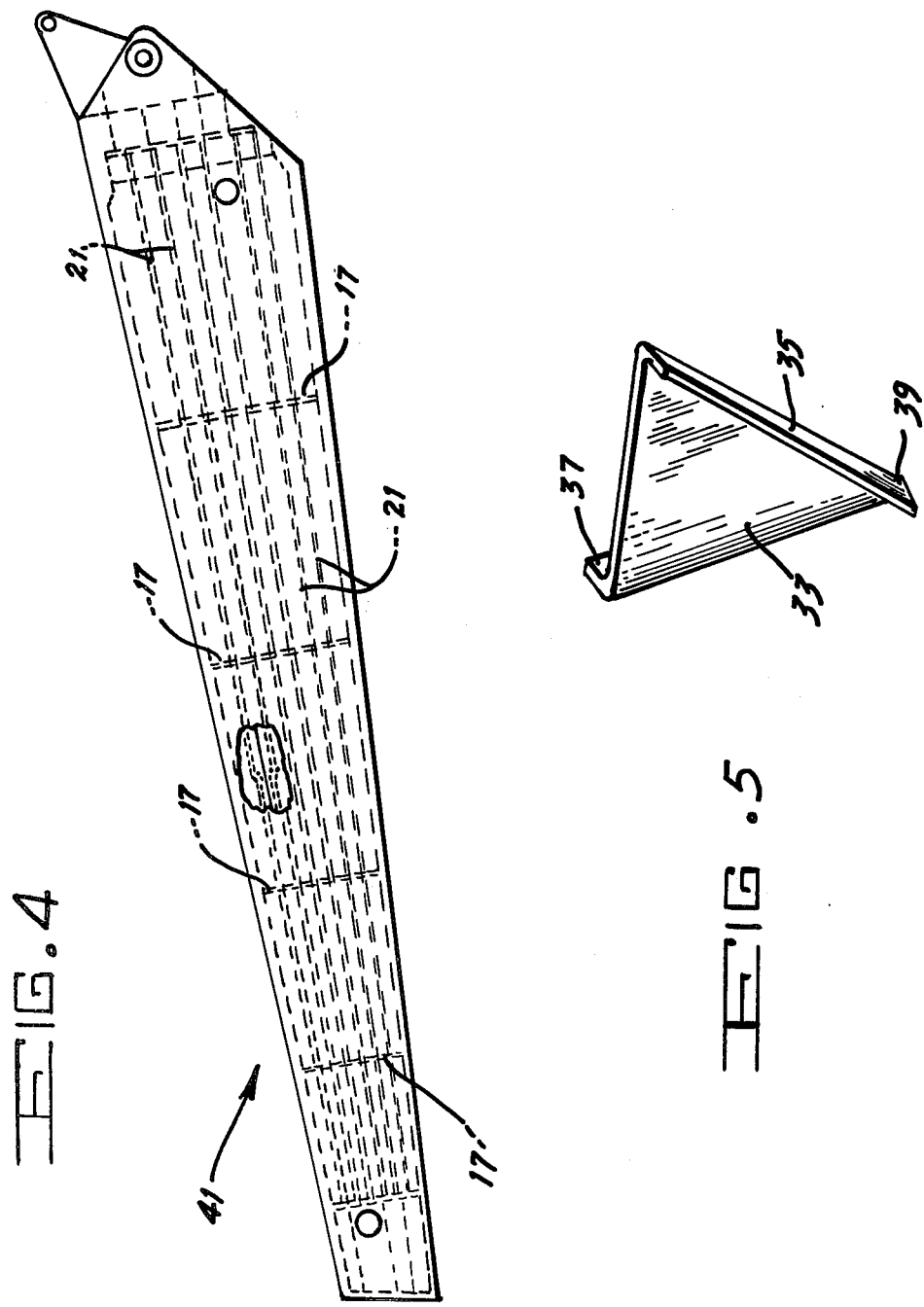

CANTED SPAR WITH INTERMEDIATE INTERCOSTAL STIFFENERS

STATEMENT OF GOVERNMENT INTEREST

The invention described herein may be manufactured and used by or for the Government for governmental purposes without the payment of any royalty thereon.

BACKGROUND OF THE INVENTION

This invention relates to an aircraft wing box construction and, more particularly, the invention is concerned with providing an aircraft wing structure having conventional front and rear main spars along with a plurality of intermediate auxiliary spars canted from the vertical and braced by a plurality of substantially triangular intercostal, spanwise spaced stiffeners. A spar web with one side of the intercostal stiffeners attached thereto is attached at its lower edge to a single spanwise machined spar cap while its upper edge is attached to one of a pair of spaced apart spanwise extended spar caps. The upper edge of the other side of each of the intercostal stiffeners is attached to the other of the pair of upper spar caps.

An airframe wing is essentially two cantilever beams joined together. Each wing tip is the free end of a cantilever, and the center line of the vehicle represents the plane where the two fixed ends of the cantilevers are joined. The prime load-carrying portions of these cantilevers is a box beam made up usually of two or more vertical webs, plus a major portion of the upper and lower skins of the wing, which serve as chords of the beam. This box section also provides torsional strength and rigidity. Normally the prime box is designed to carry all the primary structural loads; these include all beam shears and bending moments, all drag shears and bending moments and the torsional or twisting loads.

At numerous places within the wing box, bulkhead-type structures called ribs are located. These internal structures serve to maintain the rectangular box shape and to cut down the unsupported length of compression cover structures, to separate fuel tanks, and to distribute concentrated loads from guns, bombs, landing gear, or engines into the prime box. They are also located at any wing cross section where major load redistributions occur.

The top of the prime box is the compression chord of the cantilever beam. It is also that portion of the box where the greatest variations in construction are found among the products of various manufacturers. The desirability of minimum weight and the requirements of the various positive and negative bending conditions have produced numerous configurations. In the present invention a series of spanwise continuous extended angle spar caps supported by intercostals and web provide sufficient strength to prevent upper skin buckling up to ultimate design stress while allowing a thinner and lighter upper skin as a result of the increased compression stabilization provided.

SUMMARY OF THE INVENTION

The present invention is concerned with providing an aircraft wing box construction with the specific purposes of optimum shear transfer and upper skin stabilization at a minimum of weight and cost. These weight and cost savings are accomplished by utilization of a canted sheet metal spar web continuously tied to the upper and lower skins. Sheet metal intercostal stiffeners fasten to the upper skin by means of spanwise continuous extruded angles. These continuous angles, supported by the intercostals and web, provide sufficient stabilization to prevent upper skin buckling up to ultimate design stress with a minimum of shear webs thereby providing significant weight savings.

Accordingly, it is an object of the invention to provide a wing box construction wherein a canted sheet metal spar web is continuously tied to upper and lower canted spar caps which are attached to the upper and lower skin of the aircraft wing.

Another object of the invention is to provide an aircraft wing box construction wherein an intercostal stiffener of substantially triangular configuration is positioned apex downwardly between the canted spar web and one of the upper spar caps and spaced spanwise along the wing structure.

Still another object of the invention is to provide an aircraft wing box construction wherein the intercostal stiffeners are configurated to allow fabrication from one blank. As wing cross-sectional dimensions proportionally decrease in the outboard direction, the formed stiffeners are simply cut down from the upper surface (base of the triangular shape) and installed.

A further object of the invention is to provide an aircraft wing box construction wherein the spar design utilizes sheet metal construction as opposed to machined conventional spars. The ratio of finished-to-raw stock weight is very high for sheet metal construction whereas machined spar construction scrap rates are usually higher than 50%.

A still further object of the invention is to provide an aircraft wing box construction wherein the tooling required for the fabrication and assembly of the finished product is kept to an absolute minimum.

Another still further object of the invention is to provide an aircraft wing box construction wherein the utilization of the canted spar with intercostal stiffener allows a thinner and lighter upper skin with a given number of spars because of the increased compression stabilization provided.

These and other objects, features and advantages will become more apparent after considering the following detailed description taken in conjunction with the annexed drawings and appended claims.

BRIEF DESCRIPTION OF THE DRAWINGS

FIG. 1 is a view in partial cross-section of a wing box according to the invention showing the canted spars and intercostal stiffeners;

FIG. 2 is an enlarged view in cross-section of a lower spar cap with the spar web and intercostal stiffener attached thereto and including a portion of the bonded laminated lower wing skin panel;

FIG. 3 is a view in perspective of an intercostal stiffener according to the invention attached to the upper spar caps and to the spar web;

FIG. 4 is a top view of a typical wing in which the invention can be utilized with the upper spar caps shown as spanwise dotted lines; and FIG. 5 is a view in perspective of an intercostal stiffener made from formed aluminum sheet according to the invention.

DESCRIPTION OF A PREFERRED EMBODIMENT

Referring now to the drawings wherein like reference numerals refer to like elements in the several views, in FIG. 1 there is shown in partial cross-section an aircraft wing box construction according to the invention. Between the machined upper skin 13 and the bonded laminated aluminum lower wing skin panel 15, there are positioned a series of spars 17. Each of the spars 17 includes a lower stepped spar cap 19 embedded in the bonded laminated aluminum lower wing panel 15. Each of the lower spar caps 19 includes a corresponding pair of upper spar caps 21 made from machined aluminum extrusion. A slanted sheet metal spar web 23 is fixedly attached by means of shear fasteners (not shown) between one of the upper spar caps 21 and the lower spar cap 19. A front spar 25 made from machined aluminum extrusion is positioned between the upper skin 13 and the lower wing panel 15 at the forward end of the wing box. A rear spar 27, likewise is positioned between the upper skin 13 and the lower wing panel 15 at the rearward end of the wing box. The front and rear spars 25 and 27 are attached to the upper skin 13 by means of blind fasteners (not shown) in a double row. A lower front spar cap 29 and a lower rear spar cap 31 serve to attach the front and rear spars 25 and 27 to the lower wing skin panel 15.

In FIG. 2, there is shown an enlarged detailed view of one of the stepped lower spar caps 19 with the web 23 attached thereto and embedded in the laminated lower wing skin panel 15. In FIG. 3, there is shown an enlarged view of one of the plurality of spars 17 with an intercostal stiffener 33 in position thereon. The intercostal stiffener 33 is substantially triangular in configuration and includes a right angled outwardly bent portion 35 along one side thereof and a inwardly bent right angled portion 37 along the other side thereof. The apex portion 39 of the intercostal stiffener 33 is fixedly attached to the spar web 23 in the region of the lower spar cap 19. The base (upper) portion of the intercostal stiffener 33 including the outwardly bent portion 35 is fixedly attached to the spar web 23 in the region of one of the upper spar caps 21 while the base (upper) portion of the intercostal stiffener 33 including the inwardly bent portion 37 is fixedly attached to the other spar cap 21.

In FIG. 4, there is shown an overall top view of a complete wing assembly 41 in which the wing box construction according to the invention can be utilized. The spanwise dotted lines along the upper surface of the wing 41 represent the spar caps 21. It can be seen that in this configuration of a substantially conical surface wing, all spanwise element lines converge to a single apex allowing a minimum of different type parts since only a single formed intercostal blank is required. As the wing cross-sectional dimensions proportionally decrease in the outboard direction, these formed intercostal stiffeners 33 (shown in FIG. 5) are simply cut down from the top and installed thereby resulting in significant cost savings.

The hereinbefore described spar design is superior to conventional spar design because of the utilization of sheet metal construction as opposed to machined construction for conventional spars. The finished to raw stock weight ratio is very high for sheet metal construction unlike machined spar construction which experiences scrap rates usually higher than 50%. Likewise tooling required for the hereinbefore described spar is an absolute minimum. In a wing box with a given number of spars, the utilization of this canted spar with intercostal stiffeners allows a thinner and lighter upper skin due to the increased compression stabilization provided.

Although the invention has been illustrated in the accompanying drawings and described in the foregoing specification in terms of a preferred embodiment thereof, the invention is not limited to this embodiment or to the preferred configuration shown. It can be seen that the sheet metal intercostal stiffeners which are spaced spanwise along the web, provide shear stiffening for the web and intermittent stabilization for the upper skin. It will be apparent to those skilled in the art that certain changes, modifications and substitutions can be made, particularly with respect to the construction details, without departing from the true spirit and scope of the appended claims.

Having thus set forth the nature of our invention, what we claim and desire to secure by Letters Patent of the United States is:

1. A box construction for an aircraft wing having an upper skin and a laminated lower skin with front and rear spars positioned therebetween at the forward and aft edges thereof, said aircraft wing comprising a plurality of pairs of upper spar caps extending spanwise along the length of the inner surface of the wing upper skin and fixedly attached thereto, said pairs of upper spar caps being spaced chordwise across the wing structure and canted to the upper surface thereof, a plurality of lower spar caps extending spanwise along the length of the inner surface of the wing lower skin and fixedly attached thereto and canted to the surface thereof, each of said lower spar caps being positioned under and midway between each pair of said upper spar caps, a spar web fixedly attached between each of said lower spar caps and one of each of said pairs of upper spar caps and extending spanwise along the length of the wing structure, and a plurality of intercostal stiffeners at spaced intervals spanwise along the length of the wing structure wherein each intercostal stiffener is of substantially triangular configuration positioned apex downwardly between the other of each of said pairs of upper spar caps and one of said spar webs thereby providing sufficient stabilization to prevent upper skin buckling up to ultimate design stress with a minimum of shear webs at significant weight savings.

2. The box construction for an aircraft wing defined in claim 1 wherein each said intercostal stiffener of triangular configuration includes a right angled outwardly bent portion along one side thereof attached to said spar web and a right angled inwardly bent portion along the other side thereof, the upper end of said inwardly bent portion being attached to the other of said upper spar caps.

3. The box construction for an aircraft wing defined in claim 2 wherein said intercostal stiffeners of triangular configuration are fabricated of sheet aluminum.

* * * * *